(12) United States Patent
Nabeshi

(10) Patent No.: US 11,476,777 B2
(45) Date of Patent: Oct. 18, 2022

(54) POWER CONVERSION DEVICE, DRIVING DEVICE, AND POWER STEERING DEVICE

(71) Applicant: Nidec Corporation, Kyoto (JP)

(72) Inventor: Kaori Nabeshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 148 days.

(21) Appl. No.: 16/968,619

(22) PCT Filed: Feb. 8, 2019

(86) PCT No.: PCT/JP2019/004595
§ 371 (c)(1),
(2) Date: Aug. 10, 2020

(87) PCT Pub. No.: WO2019/159834
PCT Pub. Date: Aug. 22, 2019

(65) Prior Publication Data
US 2021/0050798 A1 Feb. 18, 2021

(30) Foreign Application Priority Data
Feb. 15, 2018 (JP) .............................. JP2018-024654

(51) Int. Cl.
*H02M 7/5387* (2007.01)
*H02P 25/22* (2006.01)
*H02P 27/06* (2006.01)

(52) U.S. Cl.
CPC .......... *H02M 7/5387* (2013.01); *H02P 25/22* (2013.01); *H02P 27/06* (2013.01)

(58) Field of Classification Search
CPC .......... H02M 7/5387; H02M 7/53873; H02M 7/53871; H02P 25/22; H02P 27/06
See application file for complete search history.

(56) References Cited

U.S. PATENT DOCUMENTS

| | | | |
|---|---|---|---|
| 2021/0067080 A1* | 3/2021 | Endo | H02P 27/14 |
| 2021/0075301 A1* | 3/2021 | Ichikawa | H02K 16/04 |
| 2021/0297006 A1* | 9/2021 | Takahashi | H02M 1/0048 |
| 2021/0384863 A1* | 12/2021 | Omata | H02P 27/08 |

FOREIGN PATENT DOCUMENTS

| | | |
|---|---|---|
| CN | 104753382 A | 7/2015 |
| JP | 2014-192950 A | 10/2014 |
| JP | 2016-181948 A | 10/2016 |
| WO | 2017/183656 A1 | 10/2017 |

OTHER PUBLICATIONS

Official Communication issued in International Patent Application No. PCT/JP2019/004595, dated Mar. 19, 2019.

* cited by examiner

*Primary Examiner* — Adolf D Berhane
(74) *Attorney, Agent, or Firm* — Keating & Bennett

(57) ABSTRACT

A power conversion device includes a first inverter including an upper arm and a lower arm and connected to a first end of a winding wire of each phase of a motor, a second inverter including an upper arm and a lower arm and connected to a second end on the other side of the first end, a first power supply to supply power to the upper arm of the first inverter and the lower arm of the second inverter, and a second power supply to supply power to the upper arm of the second inverter and the lower arm of the first inverter.

14 Claims, 9 Drawing Sheets

POWER CONVERSION DEVICE, DRIVING DEVICE, AND POWER STEERING DEVICE

CROSS REFERENCE TO RELATED APPLICATIONS

This is a U.S. national stage of PCT Application No. PCT/JP2019/004595, filed on Feb. 8, 2019, and priority under 35 U.S.C. § 119(a) and 35 U.S.C. § 365(b) is claimed from Japanese Application No. 2018-024654, filed Feb. 15, 2018; the entire disclosures of which are hereby incorporated herein by reference.

1. FIELD OF THE INVENTION

The present disclosure relates to a power conversion device, a driving device, and a power steering device.

2. BACKGROUND

Conventionally known is an inverter driving system which converts power of a motor via two inverters. Also, known is an inverter driving system of a type in which an inverter is connected to respective winding wires at each end of a motor, and in which power is independently supplied to each of the winding wires.

For example, known is a power conversion device including two inverter units. In the power conversion device, a failure of a switching element is detected by a failure detection means. In a case in which the failure occurs in the switching element, ON/OFF operation control for the switching element is switched from normal-state control to failed-state control to drive an electric rotating machine (motor) so that the electric rotating machine may continue to be driven.

In recent years, in terms of power supply in a power conversion device, a driving device, and a power steering device, it is required to improve continuity of power supply by making all or part of a driving system including a power supply and a control circuit redundant. In particular, in the above-described system in which power is independently supplied to each of the winding wires of the motor, a configuration is required in which, when one of redundant power supplies is abnormal, the other power supply continues to supply power.

SUMMARY

A power conversion device according to an example embodiment of the present invention includes a first inverter including an upper arm and a lower arm and connected to a first end of a winding wire of each phase of a motor, a second inverter including an upper arm and a lower arm and connected to a second end on the other side of the first end, a first power supply to supply power to the upper arm of the first inverter and the lower arm of the second inverter, and a second power supply to supply power to the upper arm of the second inverter and the lower arm of the first inverter.

Also, a driving device according to an example element of the present invention includes the power conversion device and a motor connected to the power conversion device and supplied with power converted by the power conversion device.

Further, a power steering device according to an example embodiment of the present invention includes the power conversion device, a motor connected to the power conversion device and supplied with power converted by the power conversion device, and a power steering mechanism driven by the motor.

The above and other elements, features, steps, characteristics and advantages of the present disclosure will become more apparent from the following detailed description of the example embodiments with reference to the attached drawings.

DETAILED DESCRIPTION

Hereinbelow, example embodiments of power conversion devices, driving devices, and power steering devices according to the present disclosure will be described with reference to the accompanying drawings. However, in order to avoid unnecessary redundancy in the following description and facilitate understanding for those skilled in the art, unnecessarily detailed description may be omitted. For example, detailed description of well-known matters and duplicate description of a substantially equal configuration may be omitted.

In the present specification, example embodiments of the present disclosure will be described by illustrating power conversion devices which convert power from a power supply into power to be supplied to a three-phase motor including three-phase (U-phase, V-phase, and W-phase) winding wires (referred to as "coils" in some cases). However, a power conversion device which converts power from a power supply into power to be supplied to an n-phase motor including n-phase (n is an integer of 4 or more) winding wires such as four-phase or five-phase winding wires is also within the scope of the present disclosure.

Figure 1:
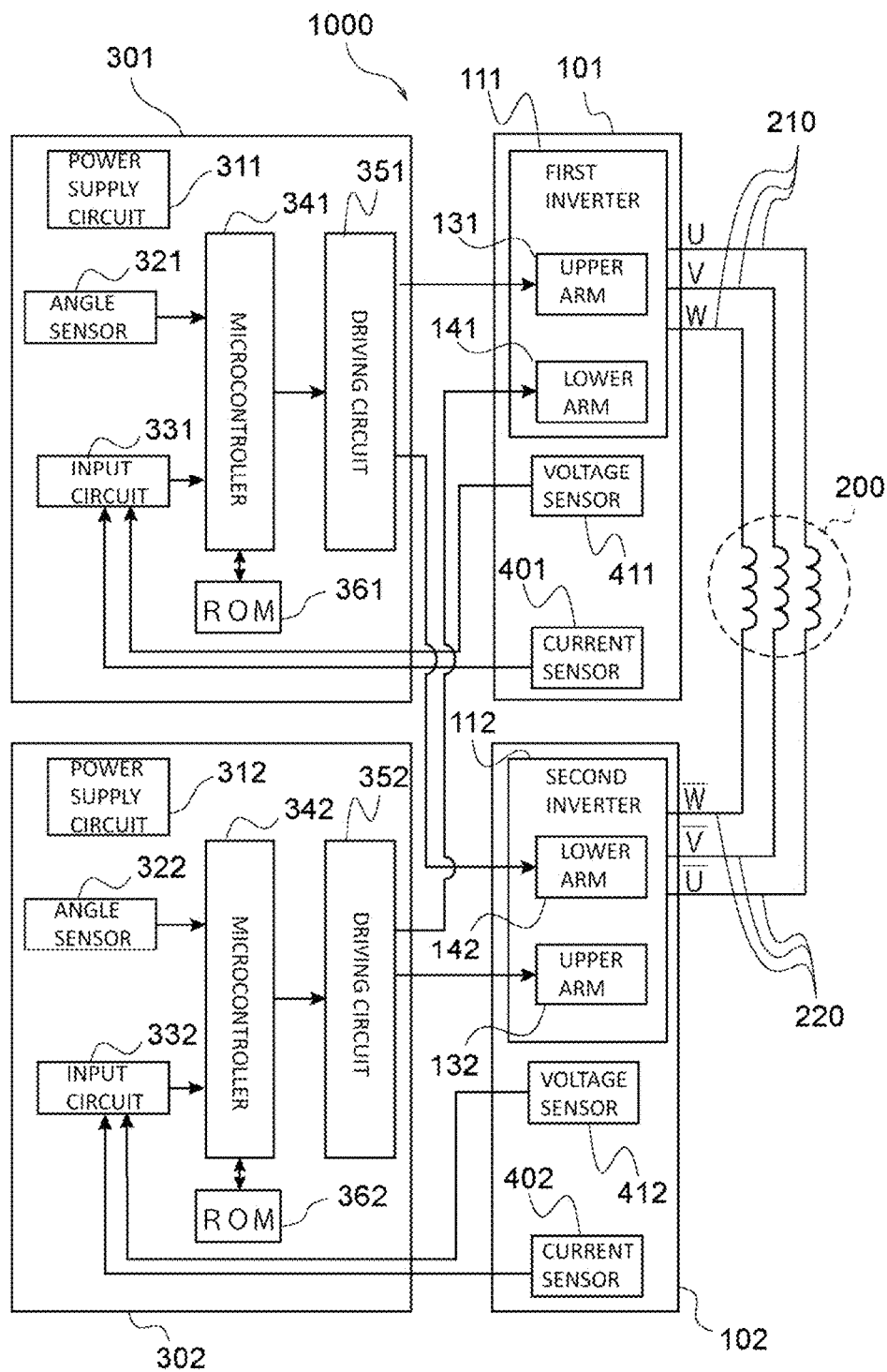
FIG. 1 schematically illustrates a block configuration of a motor driving unit according to an example embodiment of the present disclosure.

FIG. 1 schematically illustrates a block configuration of a motor driving unit 1000 according to the present example embodiment. The motor driving unit 1000 includes power supply devices 101 and 102, a motor 200, and control circuits 301 and 302.

In the present specification, the motor driving unit 1000 including the motor 200 as a component will be described. The motor driving unit 1000 including the motor 200 corresponds to an example of a driving device according to the present invention. However, the motor driving unit 1000 may be a device for driving the motor 200 from which the motor 200 as a component is omitted. The motor driving unit 1000 from which the motor 200 is omitted corresponds to an example of a power conversion device according to the present invention.

The first power supply device 101 includes a first inverter 111, a current sensor 401, and a voltage sensor 411. The second power supply device 102 includes a second inverter 112, a current sensor 402, and a voltage sensor 412.

The motor driving unit 1000 can convert power from power supplies (reference signs 403 and 404 in FIG. 2) into power to be supplied to the motor 200 by means of the two power supply devices 101 and 102. For example, the first and second inverters 111 and 112 can convert direct-current power into three-phase alternating-current power having U-phase, V-phase, and W-phase pseudo sine waves.

The inverters 111 and 112 include upper arms 131 and 132 and lower arms 141 and 142, respectively. The first inverter 111 is connected to a first end 210 of a coil of each phase of the motor 200, and the second inverter 112 is connected to a second end 220 of a coil of each phase of the motor 200. In the present specification, "connection" between parts (components) means electric connection unless otherwise specified.

The motor 200 is a three-phase alternating-current motor, for example. The motor 200 has U-phase, V-phase, and W-phase coils. A way of winding each of the coils is concentrated winding or distributed winding, for example.

Figure 2:
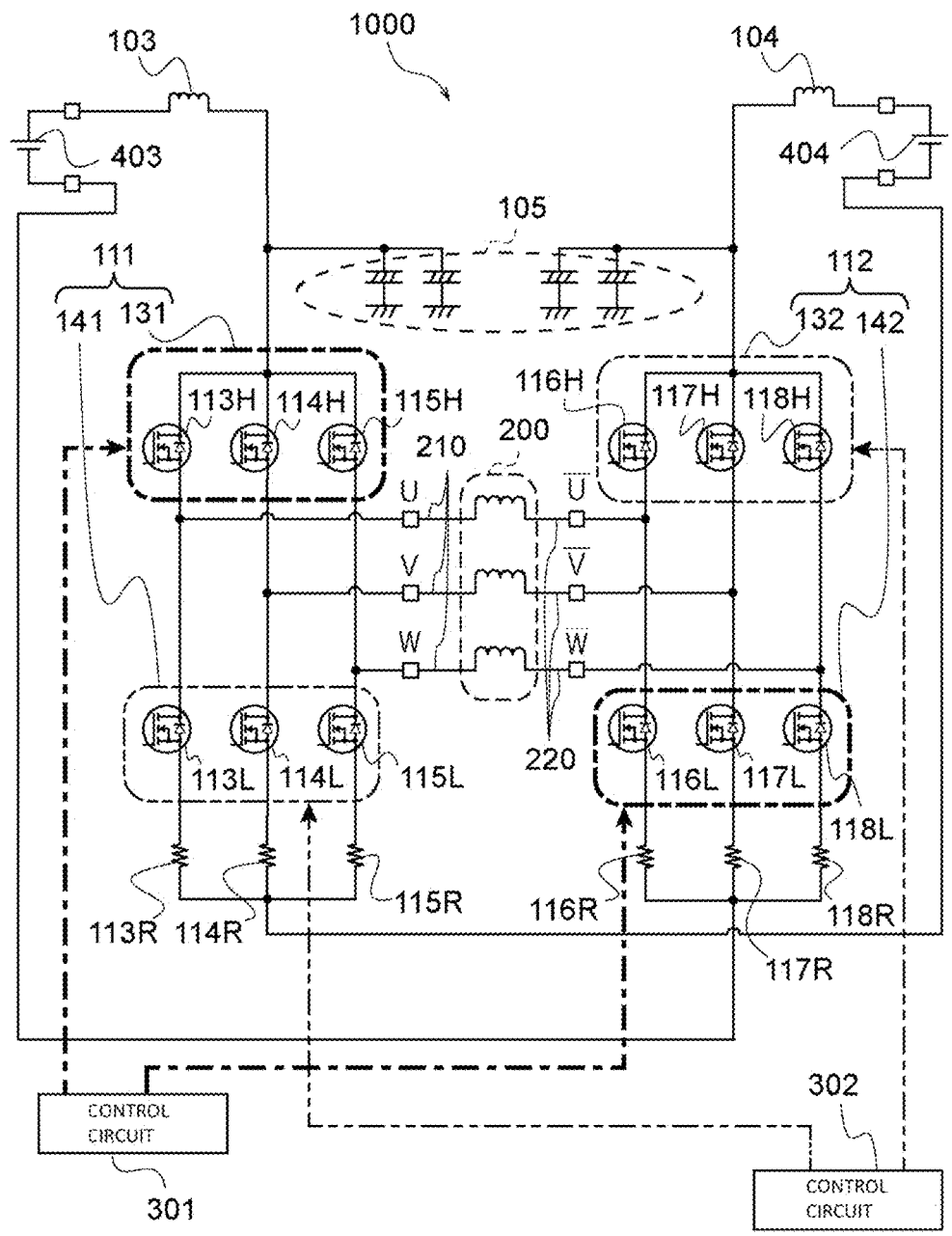
FIG. 2 schematically illustrates a circuit configuration of the motor driving unit according to an example embodiment of the present disclosure.

The control circuits 301 and 302 include microcontrollers 341 and 342 and the like as described in detail below. The first control circuit 301 controls the upper arm 131 of the first inverter 111 and the lower arm 142 of the second inverter 112 based on input signals from the current sensor 401 and an angle sensor 321. Also, the second control circuit 302 controls the upper arm 132 of the second inverter 112 and the lower arm 141 of the first inverter 111 based on input signals from the current sensor 402 and an angle sensor 322. As a control method for controlling the power supply devices 101 and 102 by means of the control circuits 301 and 302, a control method selected from vector control and direct torque control (DTC) is used, for example. A specific circuit configuration of the motor driving unit 1000 will be described with reference to FIG. 2. FIG. 2 schematically illustrates a circuit configuration of the motor driving unit 1000 according to the present example embodiment.

The motor driving unit 1000 includes the power supplies 403 and 404, coils 103 and 104, a capacitor 105, the first inverter 111, the second inverter 112, the motor 200, and the control circuits 301 and 302.

The first power supply 403 and the second power supply 404 are independent power supplies from each other. Each of the power supplies 403 and 404 generates predetermined power supply voltage (for example, 12 V). As each of the power supplies 403 and 404, a direct-current power supply is used, for example. However, each of the power supplies 403 and 404 may be an AC-DC converter or a DC-DC converter, or a battery (storage battery).

The coils 103 and 104 are provided between the power supplies 403 and 404 and the inverters 111 and 112. The coils 103 and 104 function as noise filters and smooth high frequency noise contained in voltage waveforms to be supplied to the respective inverters 111 and 112. The coils 103 and 104 also smooth high frequency noise to prevent the high frequency noise generated in the inverters 111 and 112 from flowing out to the power supplies 403 and 404. Also, the capacitor 105 is connected to power supply terminals of the respective inverters 111 and 112. The capacitor 105 is a so-called bypass capacitor and suppresses voltage ripples. The capacitor 105 is an electrolytic capacitor, for example, and the capacity and the number of capacitors to be used are appropriately determined in accordance with design specifications and the like.

The first inverter 111 includes the upper arm 131 and the lower arm 141 and is connected to the first end 210 of a coil of each phase of the motor 200. The upper arm 131 includes three high side switch elements each connected between the power supply and the motor 200. The lower arm 141 includes three low side switch elements each connected between the motor 200 and the ground.

Specifically, a high side switch element 113H and a low side switch element 113L are connected to the first end 210 of the U-phase coil. A high side switch element 114H and a low side switch element 114L are connected to the first end 210 of the V-phase coil. A high side switch element 115H and a low side switch element 115L are connected to the first end 210 of the W-phase coil. As the switch element, a field effect transistor (MOSFET or the like) or an insulated gate bipolar transistor (IGBT) is used, for example. Meanwhile, in a case in which the switch element is an IGBT, a diode (free wheel) is connected in antiparallel with the switch element.

The first inverter 111 includes, at respective legs, shunt resistors 113R, 114R, and 115R as the current sensor 401 (refer to FIG. 1) for detecting current flowing in the U-phase, V-phase, and W-phase winding wires, for example. The current sensor 401 includes a current detection circuit (not illustrated) which detects current flowing in the respective shunt resistors. For example, the shunt resistors may be connected between the low side switch elements 113L, 114L and 115L and the ground. A resistance value of each of the shunt resistors is about 0.5 mΩ to 1.0 mΩ, for example.

The number of the shunt resistors may not be three. For example, the two shunt resistors 113R and 114R for U and V phases, the two shunt resistors 114R and 115R for V and W phases, or the two shunt resistors 113R and 115R for U and W phases may be used. The number of the shunt resistors used and the arrangement of the shunt resistors are appropriately determined in consideration of product cost, design specifications, and the like.

The second inverter 112 includes the upper arm 132 and the lower arm 142 and is connected to the second end 220 of a coil of each phase of the motor 200. The upper arm 132 includes three high side switch elements each connected between the power supply and the motor 200. The lower arm 142 includes three low side switch elements each connected between the motor 200 and the ground.

Specifically, a high side switch element 116H and a low side switch element 116L are connected to the second end 220 of the U-phase coil. A high side switch element 117H and a low side switch element 117L are connected to the second end 220 of the V-phase coil. A high side switch element 118H and a low side switch element 118L are connected to the second end 220 of the W-phase coil. Similarly to the first inverter 111, the second inverter 112 includes shunt resistors 116R, 117R and 118R, for example.

The motor driving unit 1000 includes a first system corresponding to a side on which the first end 210 of each coil (winding wire) of the motor 200 is located and a second system corresponding to a side on which the second end 220 of each coil (winding wire) of the motor 200 is located. The first system includes the first power supply 403, the first inverter 111, and the first control circuit 301. The second system includes the second power supply 404, the second inverter 112, and the second control circuit 302. Targets for power supply by the power supplies 403 and 404 and targets for control by the control circuits 301 and 302 extend over the above two systems.

The first power supply 403 supplies power to the upper arm 131 of the first inverter 111 and the lower arm 142 of the second inverter 112. The second power supply 404 supplies power to the upper arm 132 of the second inverter 112 and the lower arm 141 of the first inverter 111.

The first control circuit 301 controls the upper arm 131 of the first inverter 111 and the lower arm 142 of the second inverter 112. The second control circuit 302 controls the upper arm 132 of the second inverter 112 and the lower arm 141 of the first inverter 111.

Refer to FIG. 1, again. The control circuits 301 and 302 include power supply circuits 311 and 312, the angle sensors 321 and 322, input circuits 331 and 332, the microcontrollers 341 and 342, driving circuits 351 and 352, and ROMs 361 and 362, for example. The control circuits 301 and 302 are connected to the power supply devices 101 and 102. The control circuits 301 and 302 control the first inverter 111 and the second inverter 112 as described above.

The control circuits 301 and 302 can achieve closed loop control by controlling a targeted position (rotation angle) of a rotor, targeted rotation speed of the rotor, targeted current, and the like. The rotation speed is obtained by differentiating the rotation angle (rad) with time and is expressed as the number of times of rotation (rpm) of the rotor per unit time (for example, one minute), for example. The control circuits 301 and 302 can also control targeted motor torque. The control circuits 301 and 302 may include a torque sensor for torque control, but torque can be controlled even without the torque sensor. Also, a sensorless algorithm may be provided instead of the angle sensor. Also, the two control circuits 301 and 302 synchronize their control operations by performing control in synchronization with rotation of the motor. The power supply circuits 311 and 312 generate DC voltage (for example, 3V and 5V) required for each block in the circuits.

The angle sensors 321 and 322 are resolvers or Hall ICs, for example. The angle sensors 321 and 322 are also achieved by a combination of an MR sensor having a magnetoresistive (MR) element and a sensor magnet. The angle sensors 321 and 322 detect a rotation angle of the rotor of the motor 200 and output a rotation signal representing the detected rotation angle to the microcontrollers 341 and 342. The angle sensors 321 and 322 may be omitted depending on the motor control method (for example, sensorless control). The voltage sensors 411 and 412 detect voltage between the phases of the coils of the motor 200 and output the detected voltage value to the input circuits 331 and 332.

The input circuits 331 and 332 receive the motor current value detected by the current sensors 401 and 402 (hereinbelow referred to as "actual current value") and the voltage value detected by the voltage sensors 411 and 412. The input circuits 331 and 332 convert the level of the actual current value and the voltage value into the input level of the microcontrollers 341 and 342 as needed and output the actual current value and the voltage value to the microcontrollers 341 and 342. The input circuits 331 and 332 are analog-digital conversion circuits.

The microcontrollers 341 and 342 receive the rotation signal of the rotor detected by the angle sensors 321 and 322 and the actual current value and the voltage value output from the input circuits 331 and 332. The microcontrollers 341 and 342 set a target current value in accordance with the actual current value and the rotation signal of the rotor, generate a PWM signal, and output the generated PWM signal to the driving circuits 351 and 352. For example, the microcontrollers 341 and 342 generate a PWM signal for controlling a switching operation (turn-on or turn-off) of each switch element in the inverters 111 and 112 of the power supply devices 101 and 102.

Also, the microcontrollers 341 and 342 can determine a control method for controlling the first inverter 111 and the second inverter 112 in accordance with the received voltage value.

The driving circuits 351 and 352 are gate drivers, for example. The driving circuits 351 and 352 generate a control signal (for example, a gate control signal) for controlling a switching operation of each switch element in the first inverter 111 and the second inverter 112 in accordance with the PWM signal and provide the generated control signal to each switch element. The microcontrollers 341 and 342 may have the functions of the driving circuits 351 and 352. In this case, the driving circuits 351 and 352 are omitted.

The ROMs 361 and 362 are writable memories (for example, PROMs), rewritable memories (for example, flash memories), or read-only memories, for example. The ROMs 361 and 362 store a control program including a command group for causing the microcontrollers 341 and 342 to control the power supply devices 101 and 102 (mainly the inverters 111 and 112). For example, the control program is once expanded in a RAM (not illustrated) at the time of booting. Control of the inverters 111 and 112 by means of the control circuits 301 and 302 (mainly the microcontrollers 341 and 342) includes normal-state control and abnormal-state control. Hereinbelow, a specific example of an operation of the motor driving unit 1000, mainly operations of the inverters 111 and 112, will be described.

First, a specific example of a method for controlling the inverters 111 and 112 in a normal state will be described. The normal state means a state in which all of the two power supplies 403 and 404, the two inverters 111 and 112, and the two control circuits 301 and 302 operate normally.

Figure 3:
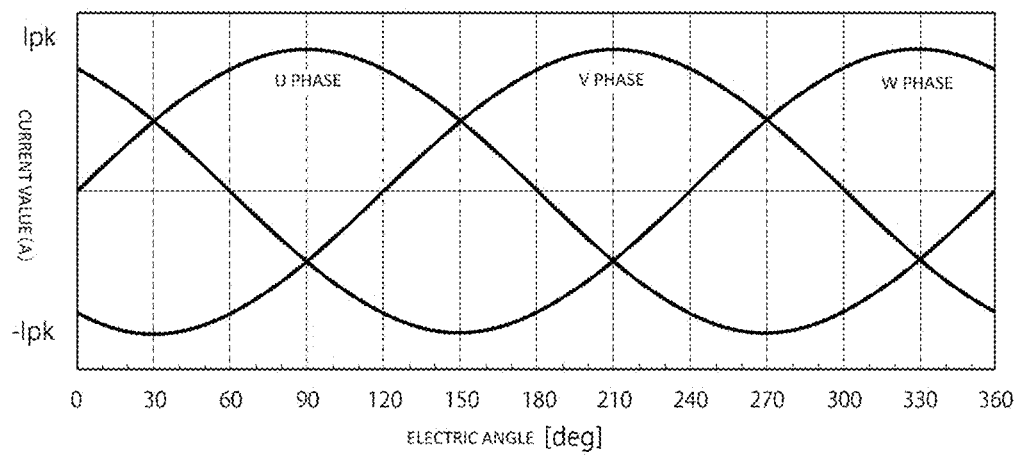
FIG. 3 illustrates a current value flowing in each coil of each phase of a motor in a normal state.

In the normal state, the control circuits 301 and 302 perform three-phase power distribution control with use of both the upper arms 131 and 132 and the lower arms 141 and 142 of the first inverter 111 and the second inverter 112 to drive the motor 200. For example, the control circuits 301 and 302 can perform the three-phase power distribution control by switching-controlling the switch elements of the first inverter 111 and the switch elements of the second inverter 112 so that a duty may cyclically change. The cyclic changes of the duties in the first inverter 111 and the second inverter 112 can be switched by the control circuits 301 and 302. For example, the control circuits 301 and 302 may switch the cyclic changes so that the first inverter 111 and the second inverter 112 may have opposite phases (phase difference=180°). FIG. 3 illustrates a current value flowing in each coil of each phase of the motor 200 in a normal state.

FIG. 3 illustrates current waveforms (sine waves) obtained by plotting current values flowing in the U-phase, V-phase, and W-phase coils of the motor 200 when the first inverter 111 and the second inverter 112 are controlled in accordance with the three-phase power distribution control in a normal state. In FIG. 3, the horizontal axis represents a motor electric angle (deg), and the vertical axis represents a current value (A). $I_{pk}$ represents a maximum current value (peak current value) of each phase. Note that the power supply devices 101 and 102 can drive the motor 200 with use of a square wave, for example, instead of the sine wave illustrated in FIG. 3.

Table 1 illustrates current values flowing in the terminals of the respective inverters for each electric angle in the sine waves in FIG. 3. Specifically, Table 1 illustrates current values flowing at connection points between the first inverter 111 and the first ends 210 of the U-phase, V-phase and W-phase coils every 30° of the electric angle. Table 1 also illustrates current values flowing at connection points between the second inverter 112 and the second ends 220 of the U-phase, V-phase and W-phase coils every 30° of the electric angle. Here, for the first inverter 111, a direction of current flowing from the first end 210 to the second end 220 of the motor 200 is defined as a positive direction. Also, for the second inverter 112, a direction of current flowing from the second end 220 to the first end 210 of the motor 200 is defined as a positive direction. Therefore, a phase difference between the current of the first inverter 111 and the current of the second inverter 112 is 180°. In Table 1, a magnitude of a current value $I_1$ is $[(3)^{1/2}/2]*I_{pk}$, and a magnitude of a current value $I_2$ is $I_{pk}/2$.

TABLE 1

| | | Electrical angle [deg] | | | | | | | | | | |
|---|---|---|---|---|---|---|---|---|---|---|---|---|
| Normal-state operation | | 0 (360) | 30 | 60 | 90 | 120 | 150 | 180 | 210 | 240 | 270 | 300 | 330 |
| First inverter | U phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Second inverter | U phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electric angle of 0°, current flowing in the U-phase coil is "0". At an electric angle of 0°, current with a magnitude of $I_1$ flows from the second inverter 112 to the first inverter 111 in the V-phase coil, and current with a magnitude of $I_1$ flows from the first inverter 111 to the second inverter 112 in the W-phase coil.

At an electric angle of 30°, current with a magnitude of $I_2$ flows from the first inverter 111 to the second inverter 112 in the U-phase coil, current with a magnitude of $I_{pk}$ flows from the second inverter 112 to the first inverter 111 in the V-phase coil, and current with a magnitude of $I_2$ flows from the first inverter 111 to the second inverter 112 in the W-phase coil.

At an electric angle of 60°, current with a magnitude of $I_1$ flows from the first inverter 111 to the second inverter 112 in the U-phase coil, and current with a magnitude of $I_1$ flows from the second inverter 112 to the first inverter 111 in the V-phase coil. At an electric angle of 60°, current flowing in the W-phase coil is "0".

At an electric angle of 90°, current with a magnitude of $I_{pk}$ flows from the first inverter 111 to the second inverter 112 in the U-phase coil, current with a magnitude of $I_2$ flows from the second inverter 112 to the first inverter 111 in the V-phase coil, and current with a magnitude of $I_2$ flows from the second inverter 112 to the first inverter 111 in the W-phase coil.

At an electric angle of 120°, current with a magnitude of $I_1$ flows from the first inverter 111 to the second inverter 112 in the U-phase coil, and current with a magnitude of $I_1$ flows from the second inverter 112 to the first inverter 111 in the W-phase coil. At an electric angle of 120°, current flowing in the V-phase coil is "0".

At an electric angle of 150°, current with a magnitude of $I_2$ flows from the first inverter 111 to the second inverter 112 in the U-phase coil, current with a magnitude of $I_2$ flows from the first inverter 111 to the second inverter 112 in the V-phase coil, and current with a magnitude of $I_{pk}$ flows from the second inverter 112 to the first inverter 111 in the W-phase coil.

At an electric angle of 180°, current flowing in the U-phase coil is "0". At an electric angle of 180°, current with a magnitude of $I_1$ flows from the first inverter 111 to the second inverter 112 in the V-phase coil, and current with a magnitude of $I_1$ flows from the second inverter 112 to the first inverter 111 in the W-phase coil.

At an electric angle of 210°, current with a magnitude of $I_2$ flows from the second inverter 112 to the first inverter 111 in the U-phase coil, current with a magnitude of $I_{pk}$ flows from the first inverter 111 to the second inverter 112 in the V-phase coil, and current with a magnitude of $I_2$ flows from the second inverter 112 to the first inverter 111 in the W-phase coil.

At an electric angle of 240°, current with a magnitude of I1 flows from the second inverter 112 to the first inverter 111 in the U-phase coil, and current with a magnitude of I1 flows from the first inverter 111 to the second inverter 112 in the V-phase coil. At an electric angle of 240°, current flowing in the W-phase coil is "0".

At an electric angle of 270°, current with a magnitude of $I_{pk}$ flows from the second inverter 112 to the first inverter 111 in the U-phase coil, current with a magnitude of $I_2$ flows from the first inverter 111 to the second inverter 112 in the V-phase coil, and current with a magnitude of $I_2$ flows from the first inverter 111 to the second inverter 112 in the W-phase coil.

At an electric angle of 300°, current with a magnitude of $I_1$ flows from the second inverter 112 to the first inverter 111 in the U-phase coil, and current with a magnitude of $I_1$ flows from the first inverter 111 to the second inverter 112 in the W-phase coil. At an electric angle of 300°, current flowing in the V-phase coil is "0".

At an electric angle of 330°, current with a magnitude of $I_2$ flows from the second inverter 112 to the first inverter 111 in the U-phase coil, current with a magnitude of $I_2$ flows from the second inverter 112 to the first inverter 111 in the V-phase coil, and current with a magnitude of $I_{pk}$ flows from the first inverter 111 to the second inverter 112 in the W-phase coil.

In the current waveforms illustrated in FIG. 3, the total sum of the current flowing in the three-phase coils in consideration of the direction of the current is "0" for each electric angle. However, according to the circuit configurations of the power supply devices 101 and 102, the current flowing in each of the three-phase coils is independently controlled. Therefore, the control circuits 301 and 302 can also take control so that the total sum of the current may be a value other than "0".

A specific example of a method for controlling the first inverter 111 and the second inverter 112 in an abnormal state will be described.

The abnormal state means a state in which one or more of the two power supplies 403 and 404, the two inverters 111 and 112, and the two control circuits 301 and 302 fail(s). An abnormality is roughly categorized as an abnormality in the first system or an abnormality in the second system. Also, the abnormality in each system includes an abnormality due to a failure of the inverter 111 or 112 and an abnormality of the driving system including the power supplies 403 and 404 and the control circuits 301 and 302. Further, the failure of the inverter 111 or 112 includes disconnection, short circuit, a failure of any of the switch elements, and the like in the inverter circuit.

The "abnormality of the driving system" includes various abnormal states such as an abnormality of only the power supply 403 or 404, an abnormality of only the control circuit 301 or 302, abnormalities of both the power supply 403 or 404 and the control circuit 301 or 302, and a state in which the operation of the control circuit 301 or 302 stops along with an abnormality of the power supply 403 or 404.

As a control method in an abnormal state due to a failure of the inverter 111 or 112, a control method described in JP 2014-192950 A is used, for example. Hereinbelow, a control method when the driving system is abnormal will be described.

As an example of abnormality detection, the control circuits 301 and 302 (mainly the microcontrollers 341 and 342) analyze voltage values detected by the voltage sensors 411 and 412 to detect an abnormality in the counterpart system on the other side of the system to which the self belongs among the two systems. Each of the control circuits 301 and 302 can check voltage in the upper arm 131 or 132 and the lower arm 141 or 142 which are under the control of the control circuit 301 or 302 of the counterpart via the upper arm 131 or 132 and the lower arm 141 or 142 which are under the control of the self. Specifically, the upper arm 131 or 132 and the lower arm 141 or 142 provided in one inverter 111 or 112 and connected to each other are controlled by the different control circuits 301 and 302. Each of the voltage sensors 411 and 412 detects voltage of the wiring connecting the upper arm 131 or 132 to the lower arm 141 or 142.

As another example of the abnormality detection, the microcontrollers 341 and 342 can also detect an abnormality by analyzing a difference between an actual current value and a target current value of the motor. However, the control circuits 301 and 302 can also use various known methods for the abnormality detection, not only these methods.

When the microcontrollers 341 and 342 detect an abnormality, the control circuits 301 and 302 switch control of the inverters 111 and 112 from normal-state control to abnormal-state control. For example, timing to switch control from normal-state control to abnormal-state control is timing after about 10 msec. to 30 msec. of detection of the abnormality.

In the abnormal state, the control circuits 301 and 302 perform half-wave driving control for the inverters 111 and 112. In the half-wave driving control, among the upper arms 131 and 132 and the lower arms 141 and 142 included in the inverters 111 and 112, only the upper arm 131 or 132 and the lower arm 141 or 142 to be controlled by the normal control circuit 301 or 302 are driven.

For example, in a case in which one of the first power supply 403 and the second power supply 404 operates abnormally, the control circuits 301 and 302 drive the first inverter 111 and the second inverter 112 with use of the other one. As a result, when one of the power supplies 403 and 404 is abnormal, the motor driving unit 1000 can continue to supply power by means of the other power supply.

Specifically, in a case in which the control circuit 301 in the first system detects an abnormality in the driving system in the second system, power is supplied to the motor 200 by driving control of only the upper arm 131 in the first inverter 111 and the lower arm 142 in the second inverter 112 performed by the control circuit 301 in the first system. The control circuit 301 in the first system takes control in accordance with whether or not the operation of the driving system in the second system including the second power supply 404 and the second control circuit 302 is normal.

Also, in a case in which the control circuit 302 in the second system detects an abnormality in the driving system in the first system, power is supplied to the motor 200 by driving control of only the upper arm 132 in the second inverter 112 and the lower arm 141 in the first inverter 111 performed by the control circuit 302 in the second system. The control circuit 302 in the second system takes control in accordance with whether or not the operation of the driving system in the first system including the first power supply 403 and the first control circuit 301 is normal.

Figure 4A:
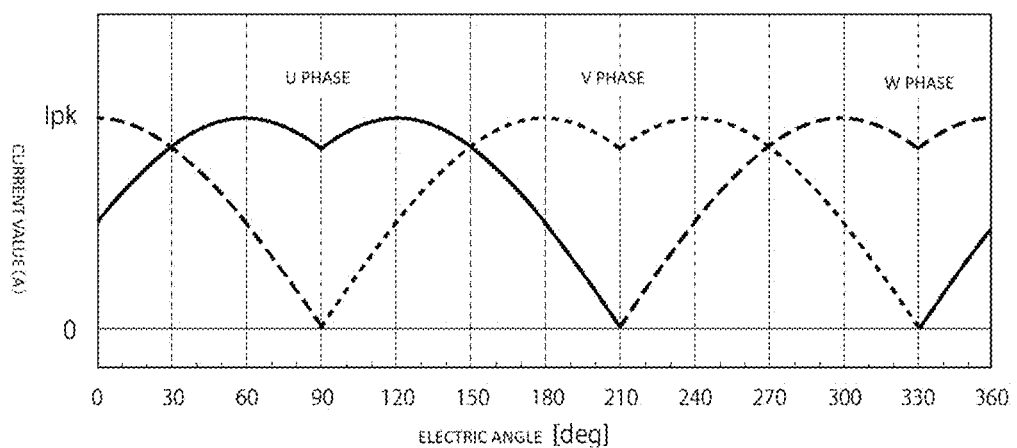
FIG. 4a illustrates an example of a current value flowing in each coil of each phase of the motor in an abnormal state.

In the first system and the second system, each of the control circuits 301 and 302 takes control in accordance with a state of the counterpart. Accordingly, even in a case in which an abnormality occurs in either the first system or the second system, appropriate driving control for power supply is performed. FIG. 4a illustrates a current value flowing in each coil of each phase of the motor 200 in an abnormal state.

FIG. 4a illustrates current waveforms obtained by plotting current values flowing in the U-phase, V-phase, and W-phase coils of the motor 200 when the first inverter 111 and the second inverter 112 are controlled in accordance with the half-wave driving control in an abnormal state. In FIG. 4a, the horizontal axis represents a motor electric angle (deg), and the vertical axis represents a current value (A). $I_{pk}$ represents a maximum current value (peak current value) of each phase.

Figure 4B:
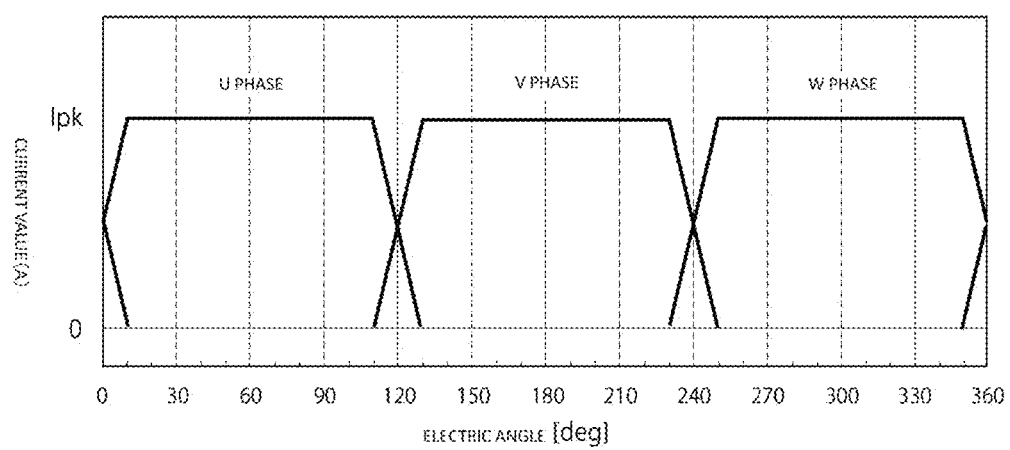
FIG. 4b illustrates a modification example of a current value flowing in each coil of each phase of the motor in an abnormal state.

In the current waveforms illustrated in FIG. 4a, output torque of the motor has a constant value. Note that the power supply devices 101 and 102 can drive the motor 200 with use of current waveforms instead of the current waveforms illustrated in FIG. 4a. For example, the power supply devices 101 and 102 can drive the motor 200 with use of trapezoidal current waveforms illustrated in FIG. 4b.

Table 2 illustrates current values flowing in the U-phase, V-phase, and W-phase coils of the motor 200 for each electric angle in a case in which the first inverter 111 and the second inverter 112 are controlled in accordance with the power distribution control enabling the current waveforms illustrated in FIG. 4a to be obtained. Specifically, Table 2 illustrates current values flowing at connection points between the second inverter 112 and the second ends 220 of the U-phase, V-phase and W-phase coils every 30° of the electric angle in a case in which an abnormality occurs in the first system, for example. The definition of the current direction is one described above.

TABLE 2

| Abnormal-state operation | Electrical angle [deg] | | | | | | | | | | | |
|---|---|---|---|---|---|---|---|---|---|---|---|---|
| | 0 (360) | 30 | 60 | 90 | 120 | 150 | 180 | 210 | 240 | 270 | 300 | 330 |
| U phase | $I_2$ | $I_1$ | $I_{pk}$ | $I_1$ | $I_{pk}$ | $I_1$ | $I_2$ | 0 | 0 | 0 | 0 | 0 |
| V phase | 0 | 0 | 0 | 0 | $I_2$ | $I_1$ | $I_{pk}$ | $I_1$ | $I_{pk}$ | $I_1$ | $I_2$ | 0 |
| W phase | $I_{pk}$ | $I_1$ | $I_2$ | 0 | 0 | 0 | 0 | 0 | $I_2$ | $I_1$ | $I_{pk}$ | $I_1$ |

At an electric angle of 0°, current with a magnitude of $I_2$ flows from the second inverter 112 to the first inverter 111 in the U-phase coil, current with a magnitude of $I_{pk}$ flows from the second inverter 112 to the first inverter 111 in the W-phase coil, and current flowing in the V-phase coil is "0".

At an electric angle of 30°, current with a magnitude of $I_1$ flows from the second inverter 112 to the first inverter 111 in the U-phase coil, current with a magnitude of $I_1$ flows from the second inverter 112 to the first inverter 111 in the W-phase coil, and current flowing in the V-phase coil is "0".

At an electric angle of 60°, current with a magnitude of $I_{pk}$ flows from the second inverter 112 to the first inverter 111 in the U-phase coil, current with a magnitude of $I_2$ flows from the second inverter 112 to the first inverter 111 in the W-phase coil, and current flowing in the V-phase coil is "0".

At an electric angle of 90°, current with a magnitude of $I_1$ flows from the second inverter 112 to the first inverter 111 in the U-phase coil, and current flowing in the V-phase and W-phase coils is "0".

At an electric angle of 120°, current with a magnitude of $I_{pk}$ flows from the second inverter 112 to the first inverter 111 in the U-phase coil, current with a magnitude of $I_2$ flows from the second inverter 112 to the first inverter 111 in the V-phase coil, and current flowing in the W-phase coil is "0".

At an electric angle of 150°, current with a magnitude of $I_1$ flows from the second inverter 112 to the first inverter 111 in the U-phase coil, current with a magnitude of $I_1$ flows from the second inverter 112 to the first inverter 111 in the V-phase coil, and current flowing in the W-phase coil is "0".

At an electric angle of 180°, current with a magnitude of $I_2$ flows from the second inverter 112 to the first inverter 111 in the U-phase coil, current with a magnitude of $I_{pk}$ flows from the second inverter 112 to the first inverter 111 in the V-phase coil, and current flowing in the W-phase coil is "0".

At an electric angle of 210°, current with a magnitude of $I_1$ flows from the second inverter 112 to the first inverter 111 in the V-phase coil, and current flowing in the U-phase and W-phase coils is "0".

At an electric angle of 240°, current flowing in the U-phase coil is "0", current with a magnitude of $I_{pk}$ flows from the second inverter 112 to the first inverter 111 in the V-phase coil, and current with a magnitude of $I_2$ flows from the second inverter 112 to the first inverter 111 in the W-phase coil.

At an electric angle of 270°, current flowing in the U-phase coil is "0", current with a magnitude of $I_1$ flows from the second inverter 112 to the first inverter 111 in the V-phase coil, and current with a magnitude of $I_1$ flows from the second inverter 112 to the first inverter 111 in the W-phase coil.

At an electric angle of 300°, current flowing in the U-phase coil is "0", current with a magnitude of $I_2$ flows from the second inverter 112 to the first inverter 111 in the V-phase coil, and current with a magnitude of $I_{pk}$ flows from the second inverter 112 to the first inverter 111 in the W-phase coil.

At an electric angle of 330°, current flowing in the U-phase and V-phase coils is "0", and current with a magnitude of $I_1$ flows from the second inverter 112 to the first inverter 111 in the W-phase coil.

Figure 5:
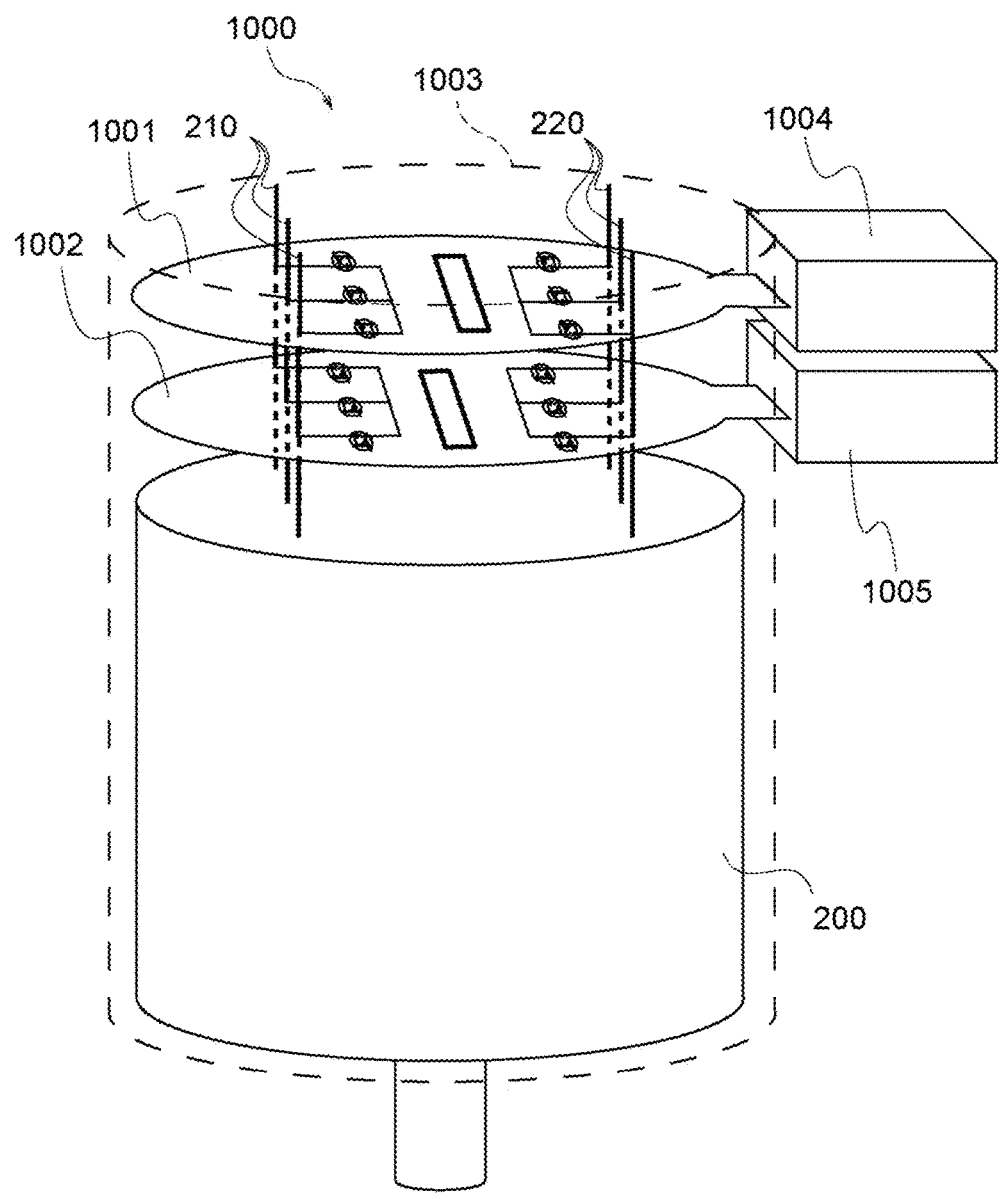
FIG. 5 schematically illustrates a hardware configuration of the motor driving unit.

Next, a hardware configuration of the motor driving unit 1000 will be described. FIG. 5 schematically illustrates a hardware configuration of the motor driving unit 1000.

The motor driving unit 1000 includes, as a hardware configuration, the above-described motor 200, a first mounting board 1001, a second mounting board 1002, a housing 1003, and connectors 1004 and 1005.

The first ends 210 and the second ends 220 of the coils project from the motor 200 and extend toward the mounting boards 1001 and 1002. Both the first ends 210 and the second ends 220 of the coils are connected to one of the first mounting board 1001 and the second mounting board 1002, and both the first ends 210 and the second ends 220 pass through the one of the first mounting board 1001 and the second mounting board 1002 and are connected to the other one. Specifically, both the first ends 210 and the second ends 220 of the coils are connected to the second mounting board 1002, for example. Also, both the first ends 210 and the second ends 220 of the coils pass through the second mounting board 1002 and are connected to the first mounting board 1001.

The board surfaces of the first mounting board 1001 and the second mounting board 1002 are opposite to each other. The rotation axis of the motor 200 extends in a direction in which the board surfaces are opposite to each other. The first mounting board 1001, the second mounting board 1002, and the motor 200 are housed in the housing 1003 to cause the positions thereof to be fixed.

The connector 1004 to which a power supply cord from the first power supply 403 is connected is attached to the first mounting board 1001. The connector 1005 to which a power supply cord from the second power supply 404 is connected is attached to the second mounting board 1002.

Figure 6:
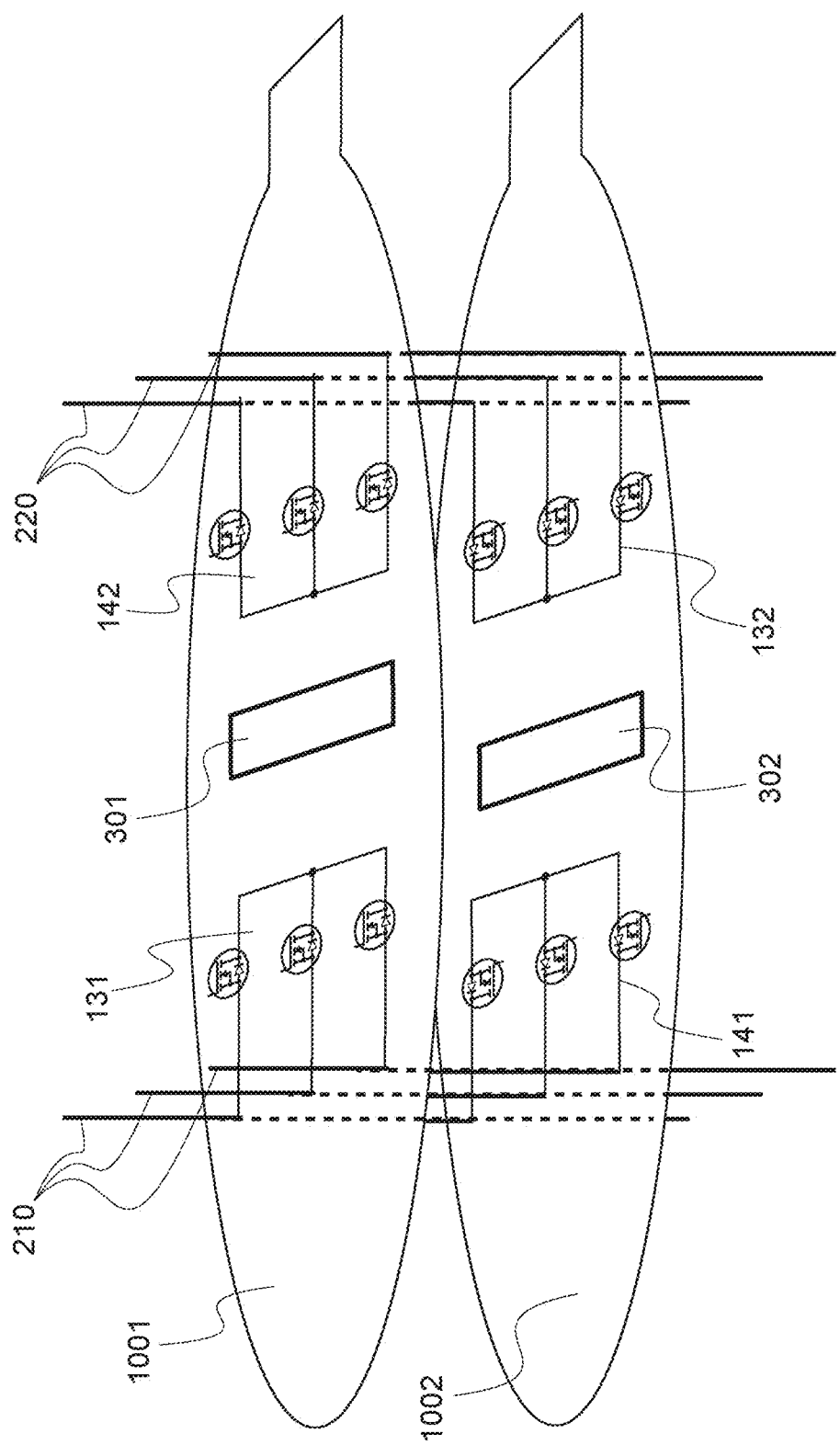
FIG. 6 schematically illustrates hardware configurations of a first mounting board and a second mounting board.

FIG. 6 schematically illustrates hardware configurations of the first mounting board 1001 and the second mounting board 1002.

On the first mounting board 1001, the upper arm 131 of the first inverter 111 and the lower arm 142 of the second inverter 112 are mounted. Also, on the second mounting board 1002, the upper arm 132 of the second inverter 112 and the lower arm 141 of the first inverter 111 are mounted. By allocating the elements to the two mounting boards 1001 and 1002 in this manner, wiring of the upper arms 131 and 132 and the lower arms 141 and 142 to the first ends 210 and the second ends 220 of the coils is simplified, and an efficient element arrangement is achieved.

The first control circuit 301 may also be mounted on the first mounting board 1001. The second control circuit 302 may also be mounted on the second mounting board 1002. When each of the control circuits 301 and 302 is mounted on each of the mounting boards on which the elements to be controlled by each of the control circuits 301 and 302 are mounted, the wiring for control lies within each of the boards. Therefore, an efficient element arrangement is achieved.

The upper arm 131 on the first mounting board 1001 and the lower arm 141 on the second mounting board 1002 may be mounted at positions at which the upper arm 131 and the lower arm 141 overlap with each other as viewed in a direction in which the first mounting board 1001 and the second mounting board 1002 are opposite to each other. Also, the lower arm 142 on the first mounting board 1001 and the upper arm 132 on the second mounting board 1002 may be mounted at positions at which the lower arm 142 and the upper arm 132 overlap with each other as viewed in a direction in which the first mounting board 1001 and the second mounting board 1002 are opposite to each other. Due to such a circuit arrangement, an efficient element arrangement in which the arrangement areas on the mounting boards 1001 and 1002 are effectively utilized is achieved.

The upper arm 131 on the first mounting board 1001 and the upper arm 132 on the second mounting board 1002 may be arranged symmetrically as viewed in a direction in which the first mounting board 1001 and the second mounting board 1002 are opposite to each other. Also, the lower arm 142 on the first mounting board 1001 and the lower arm 141 on the second mounting board 1002 may be arranged symmetrically as viewed in a direction in which the first mounting board 1001 and the second mounting board 1002 are opposite to each other. Due to such a symmetrical arrangement, the two mounting boards 1001 and 1002 can have a board design in common.

Figure 7:
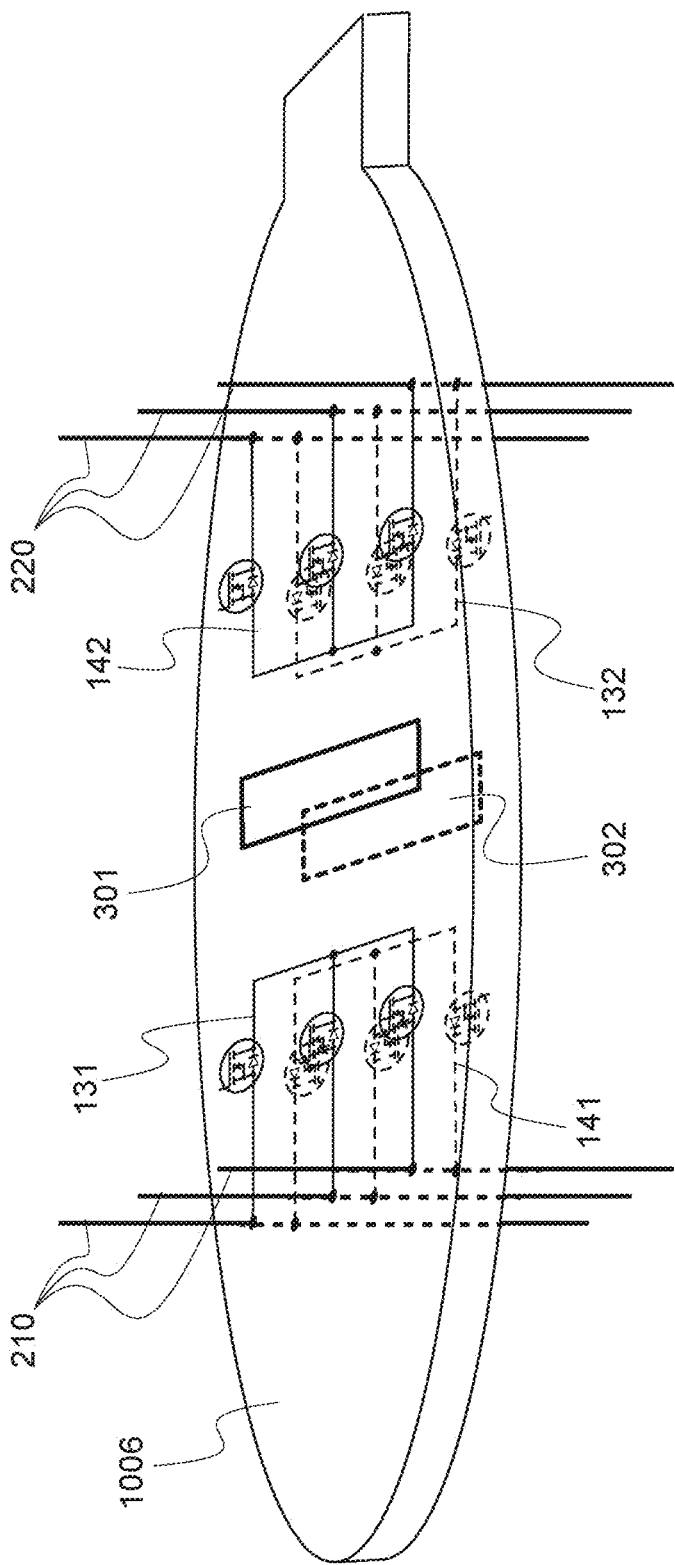
FIG. 7 schematically illustrates a hardware configuration of a mounting board according to a modification example of an example embodiment of the present disclosure.

FIG. 7 schematically illustrates a hardware configuration of a mounting board according to a modification example of the present example embodiment.

In the modification example illustrated in FIG. 7, one double-sided mounting board 1006 is provided. On a first surface out of the front and rear surfaces of the double-sided mounting board 1006, the upper arm 131 of the first inverter 111 and the lower arm 142 of the second inverter 112 are mounted. On a second surface on the other side of the first surface, the upper arm 132 of the second inverter 112 and the lower arm 141 of the first inverter 111 are mounted. By allocating the elements to the front and rear surfaces of the double-sided mounting board 1006 in this manner, wiring of the upper arms 131 and 132 and the lower arms 141 and 142 to the first ends 210 and the second ends 220 of the coils is simplified, and an efficient element arrangement is achieved.

The first control circuit 301 may also be mounted on the first surface out of the front and rear surfaces. The second control circuit 302 may also be mounted on the second surface. When each of the control circuits 301 and 302 is mounted on each of the board surfaces on which the elements to be controlled by each of the control circuits 301 and 302 are mounted, wiring for control is arranged on each of the first and second surfaces, and an efficient element arrangement is achieved.

Figure 8:
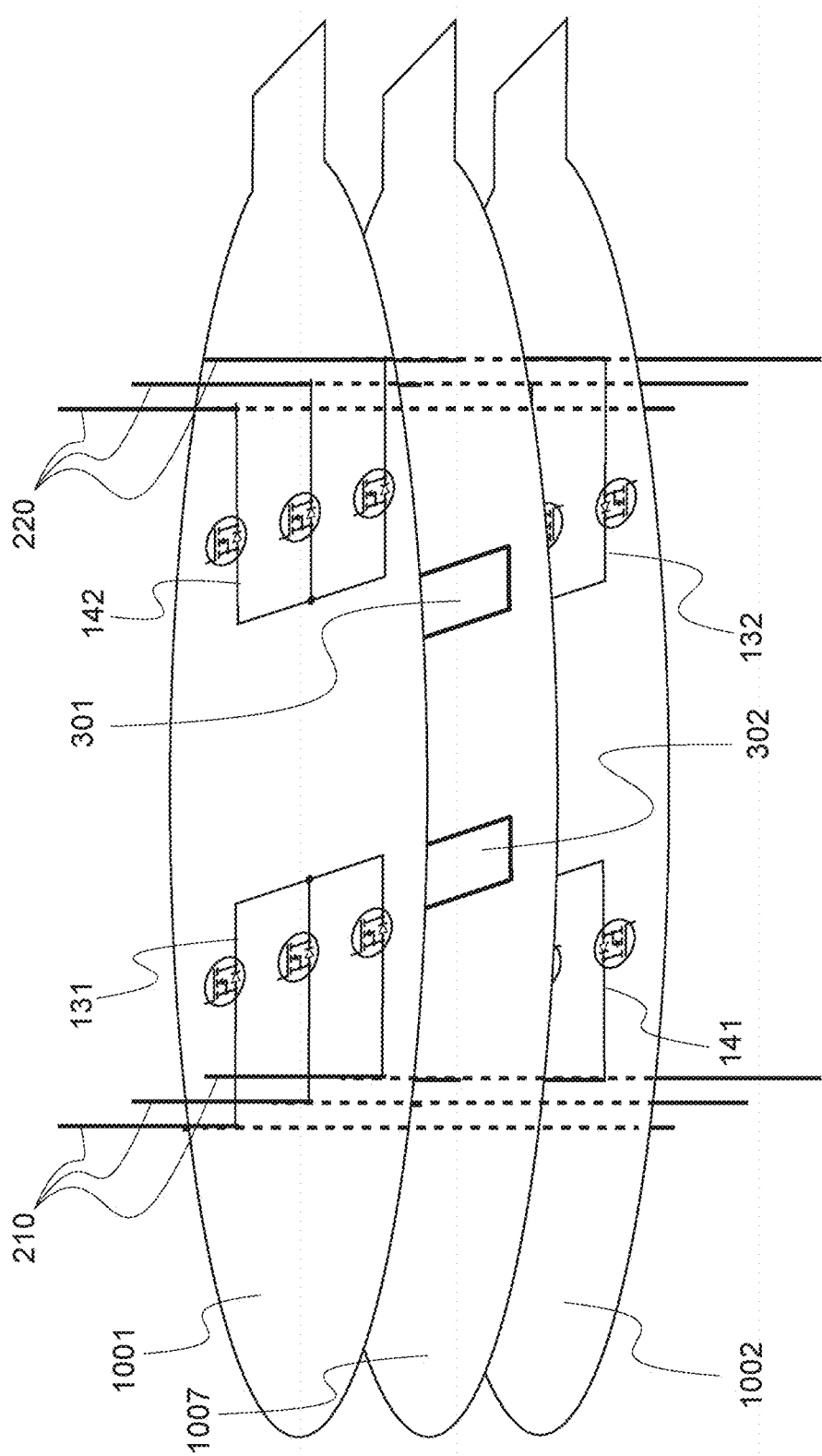
FIG. 8 schematically illustrates a hardware configuration of a mounting board according to another modification example of an example embodiment of the present disclosure.

As for specific circuit arrangements on the front and rear surfaces of the double-sided mounting board 1006, a circuit arrangement on the first surface is similar to the circuit arrangement on the first mounting board 1001 illustrated in FIG. 6, and a circuit arrangement on the second surface is similar to the circuit arrangement on the second mounting board 1002 illustrated in FIG. 6, for example. Accordingly, an efficient element arrangement in which wiring paths to the first ends 210 and the second ends 220 of the coils are simplified is achieved, and the front and rear surfaces of the double-sided mounting board 1006 can have a board design in common. FIG. 8 schematically illustrates a hardware configuration of a mounting board according to another modification example of the present example embodiment.

In the hardware configuration illustrated in FIG. 8, a third mounting board 1007 is provided in addition to the first mounting board 1001 and the second mounting board 1002. The third mounting board 1007 is located between the first mounting board 1001 and the second mounting board 1002, for example. For example, the control circuits 301 and 302 are mounted on the third mounting board 1007, and the upper arms 131 and 132 and the lower arms 141 and 142 of the inverters 111 and 112 are mounted on the first mounting board 1001 and the second mounting board 1002 in a similar manner to that in the hardware configuration illustrated in FIG. 6, for example. Due to such a hardware configuration, since the power circuit and the control circuit are separated, it is possible to improve safety and simplify power supply wiring.

A vehicle such as an automobile generally includes a power steering device. The power steering device generates assist torque for assisting steering torque in a steering system generated when a driver operates a steering wheel handle. The assist torque is generated by an assist torque mechanism and can reduce the driver's operation load. For example, the assist torque mechanism includes a steering torque sensor, an ECU, a motor, a deceleration mechanism, and the like. The steering torque sensor detects steering torque in the steering system. The ECU generates a driving signal based on a detection signal of the steering torque sensor. The motor generates assist torque in accordance with the steering torque based on the driving signal and transmits the assist torque to the steering system via the deceleration mechanism.

Figure 9:
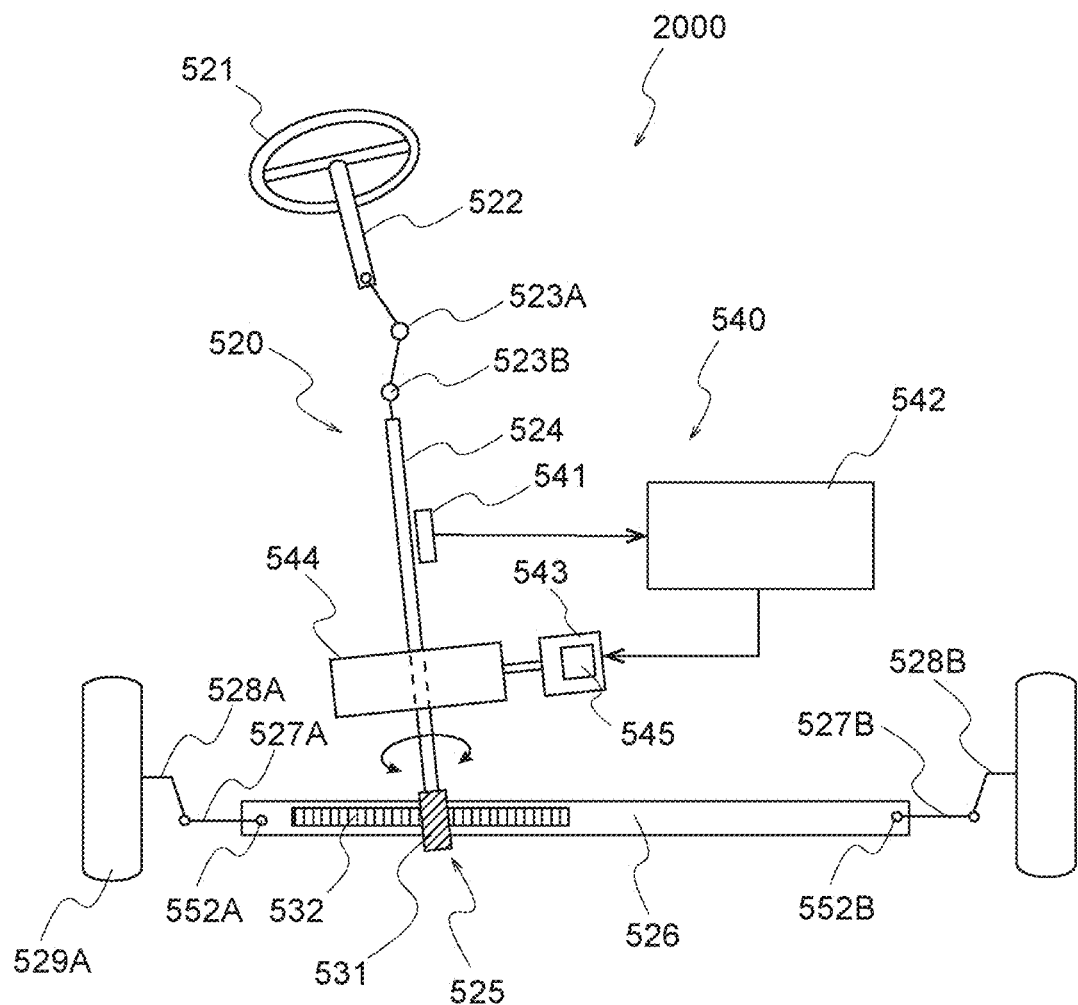
FIG. 9 schematically illustrates a configuration of a power steering device according to an example embodiment of the present disclosure.

The motor driving unit 1000 according to the above example embodiment is suitably used for the power steering device. FIG. 9 schematically illustrates a configuration of a power steering device 2000 according to the present example embodiment. The electric power steering device 2000 includes a steering system 520 and an assist torque mechanism 540.

The steering system 520 includes a steering wheel handle 521, a steering shaft 522 (also referred to as "a steering column"), universal joints 523A and 523B, and a rotary shaft 524 (also referred to as "a pinion shaft" or "an input shaft"), for example.

The steering system 520 also includes a rack and pinion mechanism 525, a rack shaft 526, right and left ball joints 552A and 552B, tie rods 527A and 527B, knuckles 528A and 528B, and right and left steering wheels (for example, right and left front wheels) 529A and 529B, for example.

The steering wheel handle 521 is connected to the rotary shaft 524 via the steering shaft 522 and the universal joints 523A and 523B. To the rotary shaft 524, the rack shaft 526 is connected via the rack and pinion mechanism 525. The rack and pinion mechanism 525 includes a pinion 531 provided on the rotary shaft 524 and a rack 532 provided on the rack shaft 526. To the right end of the rack shaft 526, the right steering wheel 529A is connected via the ball joint 552A, the tie rod 527A, and the knuckle 528A in this order. Similarly to the right side, to the left end of the rack shaft 526, the left steering wheel 529B is connected via the ball joint 552B, the tie rod 527B, and the knuckle 528B in this order. Here, the right side and the left side correspond to the right side and the left side viewed from the driver sitting in the seat, respectively.

According to the steering system 520, when the driver operates the steering wheel handle 521, steering torque is generated and is transmitted to the right and left steering wheels 529A and 529B via the rack and pinion mechanism 525. This allows the driver to operate the right and left steering wheels 529A and 529B.

The assist torque mechanism 540 includes a steering torque sensor 541, an ECU 542, a motor 543, a deceleration mechanism 544, and a power supply device 545, for example. The assist torque mechanism 540 adds assist torque to the steering system 520 ranging from the steering wheel handle 521 to the right and left steering wheels 529A and 529B. Note that the assist torque may be referred to as "added torque".

As the ECU 542, the control circuits 301 and 302 illustrated in FIG. 1 and the like are used, for example. Also, as the power supply device 545, the power supply devices 101 and 102 illustrated in FIG. 1 and the like are used, for example. Further, as the motor 543, the motor 200 illustrated in FIG. 1 and the like is used, for example. In a case in which the ECU 542, the motor 543, and the power supply device 545 constitute a unit generally referred to as a "mechatronical integration motor", the motor driving unit 1000 having the hardware configuration illustrated in FIG. 5 is suitably used as the unit, for example. A mechanism including the elements illustrated in FIG. 9 except the ECU 542, the motor 543, and the power supply device 545 corresponds to an example of a power steering mechanism driven by the motor 543.

The steering torque sensor 541 detects steering torque in the steering system 520 added by the steering wheel handle 521. The ECU 542 generates a driving signal for driving the motor 543 based on a detection signal from the steering torque sensor 541 (hereinbelow referred to as "a torque signal"). The motor 543 generates assist torque in accordance with the steering torque based on the driving signal. The assist torque is transmitted to the rotary shaft 524 of the steering system 520 via the deceleration mechanism 544. The deceleration mechanism 544 is a worm gear mechanism, for example. The assist torque is further transmitted from the rotary shaft 524 to the rack and pinion mechanism 525.

The power steering device 2000 is classified as a pinion assist type, a rack assist type, a column assist type, or the like depending on a position in the steering system 520 to which the assist torque is added. FIG. 9 illustrates the pinion assist type power steering device 2000. However, the power steering device 2000 is also applied to the rack assist type, the column assist type, and the like.

The ECU 542 can also be provided with a vehicle speed signal, for example, as well as the torque signal. The microcontroller of the ECU 542 can vector-control the motor 543 based on the torque signal, the vehicle speed signal, and the like.

The ECU 542 sets a target current value at least based on the torque signal. The ECU 542 preferably sets the target current value in consideration of the vehicle speed signal detected by a vehicle speed sensor and the rotation signal of the rotor detected by the angle sensor. The ECU 542 can control the driving signal of the motor 543, that is, the driving current so that an actual current value detected by the current sensor (refer to FIG. 1) may match the target current value.

According to the power steering device 2000, the right and left steering wheels 529A and 529B can be operated by the rack shaft 526 with use of combined torque obtained by adding the assist torque of the motor 543 to the steering torque of the driver. In particular, by using the motor driving unit 1000 according to the above example embodiment as the aforementioned mechatronical integration motor, appropriate current control can be performed both in a normal state and in an abnormal state. As a result, power assist in the power steering device is continued both in a normal state and in an abnormal state.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A power conversion device comprising:
   a first inverter including an upper arm and a lower arm and connected to a first end of a winding wire of each phase of a motor;
   a second inverter including an upper arm and a lower arm and connected to a second end of the winding wire on a side opposite of the first end;
   a first power supply to supply power to the upper arm of the first inverter and the lower arm of the second inverter;
   a second power supply to supply power to the upper arm of the second inverter and the lower arm of the first inverter; and
   a controller to drive, in a case in which one of the first power supply and the second power supply operates abnormally, the first inverter and the second inverter by using the other of the first power supply and the second power supply; wherein
   the controller includes:
      a first controller to control the upper arm of the first inverter and the lower arm of the second inverter; and
      a second controller to control the upper arm of the second inverter and the lower arm of the first inverter;
   the first controller performs control in accordance with whether or not an operation of a second-side driving system including the second power supply and the second controller is normal; and
   the second controller performs control in accordance with whether or not an operation of a first-side driving system including the first power supply and the first controller is normal.

2. A driving device comprising:
   the power conversion device according to claim 1; and
   a motor connected to the power conversion device and supplied with power converted by the power conversion device.

3. The driving device according to claim 2, wherein
   the power conversion device includes a first mounting board having mounted thereon the upper arm of the first inverter and the lower arm of the second inverter and a second mounting board having mounted thereon the upper arm of the second inverter and the lower arm of the first inverter; and in the motor, both the first end and the second end of the winding wire are connected to one of the first mounting board and the second mounting board, and both the first end and the second end pass through the one and are connected to the other one.

4. A power steering device comprising:

the power conversion device according to claim 1;

a motor connected to the power conversion device and supplied with power converted by the power conversion device; and a power steering mechanism driven by the motor.

5. A power conversion device comprising:

a first inverter including an upper arm and a lower arm and connected to a first end of a winding wire of each phase of a motor;

a second inverter including an upper arm and a lower arm and connected to a second end of the winding wire on a side opposite of the first end;

a first power supply to supply power to the upper arm of the first inverter and the lower arm of the second inverter;

a second power supply to supply power to the upper arm of the second inverter and the lower arm of the first inverter;

a first mounting board having mounted thereon the upper arm of the first inverter and the lower arm of the second inverter; and a second mounting board having mounted thereon the upper arm of the second inverter and the lower arm of the first inverter.

6. The power conversion device according to claim 5, further comprising a controller to drive, in a case in which one of the first power supply and the second power supply operates abnormally, the first inverter and the second inverter by using the other of the first power supply and the second power supply.

7. A driving device comprising:

the power conversion device according to claim 5; and a motor connected to the power conversion device and supplied with power converted by the power conversion device.

8. The driving device according to claim 7, wherein the power conversion device includes a first mounting board having mounted thereon the upper arm of the first inverter and the lower arm of the second inverter and a second mounting board having mounted thereon the upper arm of the second inverter and the lower arm of the first inverter; and in the motor, both the first end and the second end of the winding wire are connected to one of the first mounting board and the second mounting board, and both the first end and the second end pass through the one and are connected to the other one.

9. A power steering device comprising:

the power conversion device according to claim 5;

a motor connected to the power conversion device and supplied with power converted by the power conversion device; and a power steering mechanism driven by the motor.

10. A power conversion device comprising:

a first inverter including an upper arm and a lower arm and connected to a first end of a winding wire of each phase of a motor;

a second inverter including an upper arm and a lower arm and connected to a second end of the winding wire on a side opposite of the first end;

a first power supply to supply power to the upper arm of the first inverter and the lower arm of the second inverter;

a second power supply to supply power to the upper arm of the second inverter and the lower arm of the first inverter; and a double-sided mounting board having mounted on a first surface out of front and rear surfaces thereof the upper arm of the first inverter and the lower arm of the second inverter and having mounted on a second surface on the other side of the first surface the upper arm of the second inverter and the lower arm of the first inverter.

11. The power conversion device according to claim 10, further comprising a controller to drive, in a case in which one of the first power supply and the second power supply operates abnormally, the first inverter and the second inverter by using the other of the first power supply and the second power supply.

12. A driving device comprising:

the power conversion device according to claim 10; and a motor connected to the power conversion device and supplied with power converted by the power conversion device.

13. The driving device according to claim 12, wherein the power conversion device includes a first mounting board having mounted thereon the upper arm of the first inverter and the lower arm of the second inverter and a second mounting board having mounted thereon the upper arm of the second inverter and the lower arm of the first inverter; and in the motor, both the first end and the second end of the winding wire are connected to one of the first mounting board and the second mounting board, and both the first end and the second end pass through the one and are connected to the other one.

14. A power steering device comprising:

the power conversion device according to claim 10;

a motor connected to the power conversion device and supplied with power converted by the power conversion device; and a power steering mechanism driven by the motor.

* * * * *